United States Patent
Srinivasan (10) Patent No.: US 11,598,014 B2
(45) Date of Patent: Mar. 7, 2023

(54) ELECTROLYTIC REMOTE ION SOURCE AND ION RECYCLE (ISIR) MODULE

(71) Applicant: DIONEX CORPORATION, Sunnyvale, CA (US)

(72) Inventor: Kannan Srinivasan, Tracy, CA (US)

(73) Assignee: Dionex Corporation, Sunnyvale, CA (US)

( * ) Notice: Subject to any disclaimer, the term of this patent is extended or adjusted under 35 U.S.C. 154(b) by 35 days.

(21) Appl. No.: 17/061,786

(22) Filed: Oct. 2, 2020

(65) Prior Publication Data

US 2022/0106694 A1 Apr. 7, 2022

(51) Int. Cl.
*C25B 15/08* (2006.01)
*C25B 9/65* (2021.01)
(Continued)

(52) U.S. Cl.
CPC ............... *C25B 15/08* (2013.01); *C25B 1/04* (2013.01); *C25B 1/16* (2013.01); *C25B 1/22* (2013.01); *C25B 9/05* (2021.01); *C25B 9/65* (2021.01); *C25B 11/04* (2013.01); *C25B 15/02* (2013.01); *G01N 30/96* (2013.01); *G01N 30/02* (2013.01); *G01N 30/34* (2013.01); *G01N 2030/965* (2013.01)

(58) Field of Classification Search
None
See application file for complete search history.

(56) References Cited

U.S. PATENT DOCUMENTS 6,036,921 A 3/2000 Small et al.
6,225,129 B1 5/2001 Liu et al.
(Continued)

FOREIGN PATENT DOCUMENTS

WO 9911351 A1 3/1999
WO 2005046833 A1 5/2005

OTHER PUBLICATIONS

Chen et al., "Dual Electrolytic Eluent Generation for Oligosaccharides Analysis Using High-Performance Anion-Exchange Chromatography", Anal. Chem. 2018, 90, pp. 10910-10916.
(Continued)

*Primary Examiner* — Jennifer Wecker
*Assistant Examiner* — Bryan Kilpatrick (57) ABSTRACT

An ion source and ion recycle module includes an electrolyte reservoir, an eluent recovery chamber, and an ion exchange connector. The electrolyte reservoir includes a chamber containing an aqueous electrolyte solution including an electrolyte having a chamber inlet and a chamber outlet, and a first electrode. The chamber inlet is fluidically connected to a source chamber of an electrolytic eluent generator and configured to receive depleted electrolyte solution from the source chamber of the electrolytic eluent generator. The chamber outlet is fluidically connected to the source chamber of the electrolytic eluent generator and configured to provide recycled electrolyte solution to the electrolytic eluent generator source chamber. The eluent recovery chamber including a second electrode and configured to receive an eluent solution including eluent counter ions from the eluent generator; and the ion exchange connector including an ion exchange membrane stack.

10 Claims, 6 Drawing Sheets (51) Int. Cl.
  *C25B 9/05*   (2021.01)
  *C25B 1/04*   (2021.01)
  *C25B 1/16*   (2006.01)
  *C25B 1/22*   (2006.01)
  *C25B 11/04*  (2021.01)
  *C25B 15/02*  (2021.01)
  *G01N 30/96*  (2006.01)
  *G01N 30/02*  (2006.01)
  *G01N 30/34*  (2006.01)

(56) References Cited

U.S. PATENT DOCUMENTS

| | | |
|---|---|---|
| 6,315,954 B1 | 11/2001 | Small et al. |
| 6,316,270 B1 | 11/2001 | Small et al. |
| 6,316,271 B1 | 11/2001 | Small et al. |
| 6,562,628 B1 | 5/2003 | Liu et al. |
| 6,682,701 B1 | 1/2004 | Liu et al. |
| 8,647,573 B2 | 2/2014 | Yan |
| 9,645,124 B2 | 5/2017 | Liu et al. |
| 2009/0101582 A1 | 4/2009 | Liu et al. |
| 2014/0069176 A1* | 3/2014 | Liu .................. C25B 13/00 |
| | | 210/656 |
| 2014/0083854 A1 | 3/2014 | Riviello |
| 2019/0107518 A1* | 4/2019 | Srinivasan ............. G01N 30/96 |
| 2021/0178334 A1 | 6/2021 | Lu et al. |

OTHER PUBLICATIONS

Liu, "Electrolytic Eluent Generation: The "Just Add Water" Approach to Ion Chromatography", AnalyteGuru, Blog, https://www.analyteguru.com/t5/Blog/Electrolytic-Eluent-Generation-The-Just-Add-Water-Approach-to/ba-p/3690, 2020, pp. 1-5.

Thermo Scientific, "Dionex Eluent Generator Cartridges", Product Manual, P/N: 065018-05, 2014, pp. 1-86.

Liu et al., "Recent Developments in Electrolytic Devices for Ion Chromatography," Journal of Biochemical and Biophysical Methods, Amsterdam, Netherlands, vol. 60, No. 3, Sep. 30, 2004, pp. 205-232.

EP Examination and Search Report dated Feb. 21, 2022, to EP Patent Application No. 2119703.6.

* cited by examiner

ELECTROLYTIC REMOTE ION SOURCE AND ION RECYCLE (ISIR) MODULE

FIELD

The present disclosure generally relates to the field of ion chromatography including an electrolytic remote ion source and ion recycle (ISIR) module.

INTRODUCTION

Ion chromatography (IC) is a widely used analytical technique for the determination of anionic and cationic analytes in various sample matrices. Typical separation columns for IC have an internal diameter ranging from about 2 to 4 millimeters and are operated at flow rates ranging from 0.2 to 3 mL/min. In an effort to improve the performance of IC, research has been performed to develop separation columns with smaller diameters. Such smaller columns are typically referred to as a capillary separation column when the internal diameter is about 1 millimeter or less.

In ion chromatography, dilute solutions of acids, bases, or salts are commonly used as chromatographic eluents. Traditionally, these eluents are prepared off-line by dilution with reagent-grade chemicals. Off-line preparation of chromatographic eluents can be tedious and prone to operator errors, and often introduces contaminants. For example, dilute NaOH solutions, widely used as eluents in the ion chromatographic separation of anions, are easily contaminated by carbonate. The preparation of carbonate-free NaOH eluents is difficult because carbonate can be introduced as an impurity from the reagents or by adsorption of carbon dioxide from air. The presence of carbonate in NaOH eluents can compromise the performance of an ion chromatographic method and can cause an undesirable chromatographic baseline drift during the hydroxide gradient and even irreproducible retention times of target analytes. In recent years, several approaches that utilize the electrolysis of water and charge-selective electromigration of ions through ion-exchange media have been investigated by researchers to purify or generate high-purity ion chromatographic eluents. U.S. Pat. Nos. 6,036,921, 6,225,129, 6,316,271, 6,316,270, 6,315,954, and 6,682,701 describe electrolytic devices that can be used to generate high purity acid and base solutions by using water as the carrier. Using these devices, high purity, contaminant-free acid or base solutions are automatically generated on-line for use as eluents in chromatographic separations.

SUMMARY

In a first aspect, an ion source and ion recycle module can include an electrolyte reservoir, an eluent recovery chamber, and an ion exchange connector. The electrolyte reservoir can include a chamber and a first electrode. The chamber can contain an aqueous electrolyte solution including an electrolyte having a chamber inlet and a chamber outlet. The chamber inlet can be fluidically connected to a source chamber of an electrolytic eluent generator and can be configured to receive depleted electrolyte solution from the source chamber of the electrolytic eluent generator. The chamber outlet can be fluidically connected to the source chamber of the electrolytic eluent generator and can be configured to provide recycled electrolyte solution to the electrolytic eluent generator source chamber. The eluent recovery chamber can include a second electrode and can be configured to receive an eluent solution including eluent counter ions from the eluent generator. The ion exchange connector can include an ion exchange membrane stack. The ion exchange connector can couple the electrolyte reservoir and the eluent recovery chamber In various embodiments of the first aspect, the second electrode can be a perforated electrode.

In various embodiments of the first aspect, the ion source and ion recycle module can further include a pump configured to circulate the aqueous electrolyte solution to the source chamber of an electrolytic eluent generator.

In various embodiments of the first aspect, the ion source and ion recycle module can further include a power supply configured to drive a current between the first and second electrodes such that eluent counter ions move from the eluent solution in the eluent recovery chamber to the aqueous electrolyte solution in the electrolyte reservoir.

In various embodiments of the first aspect, the eluent counter ions can include potassium ions.

In various embodiments of the first aspect, the eluent counter ions can include methanesulfonate ions.

In a second aspect, a method can include providing an eluent stream from the eluent generator eluent outlet to an eluent recovery chamber. The eluent stream can include eluent counter ions. The eluent recovery chamber can be coupled to an electrolyte reservoir by an ion exchange connector including an ion exchange membrane stack. The method can further include applying a voltage or current across a first electrode in the electrolyte reservoir and a second electrode in the eluent recovery chamber, electrolytically splitting water at the first electrode to form a hydroxide anion or a hydronium ion in the electrolyte reservoir; and migrating a source ion from the eluent stream through the ion exchange membrane stack to the electrolyte reservoir.

In various embodiments of the second aspect, the electrolyte can include a potassium electrolyte.

In various embodiments of the second aspect, the electrolyte can include a methanesulfonate electrolyte.

In various embodiments of the second aspect, the method can further include pumping an electrolyte solution from the electrolyte reservoir to an electrolytic eluent generator. In particular embodiments, the pumping can be continuous. In particular embodiments, the pumping can be intermittent. For example, pumping can periodically replace electrolytic solution in a source chamber of the electrolytic eluent generator with the solution from the electrolyte reservoir. In particular embodiments, the electrolytic eluent generator can include a source chamber coupled to an eluent generation chamber by an ion exchange connector; and the method can further include applying a current or voltage across a third electrode in the eluent generation chamber and a fourth electrode in the second electrolyte reservoir; electrolytically splitting water at the third electrode to form a hydroxide anion or a hydronium ion in the eluent generation chamber; and migrating an eluent source ion from the source chamber through an ion exchange membrane stack of the ion exchange connector to the eluent generation chamber to combine with the hydroxide anion to form a cation hydroxide solution or the hydronium ion to form a anion acid for ion chromatography.

In a third aspect, an electrolytic eluent generator system can include an electrolytic eluent generator, an ion source and ion recycle module, and a pump. The electrolytic eluent generator can include an electrolyte reservoir, an eluent generation chamber, and a first ion exchange connector. The electrolyte reservoir can include a first chamber and a first electrode. The first chamber can contain an aqueous electrolyte solution. The first chamber can include a first inlet and a first outlet. The eluent generation chamber can include a second electrode. The first ion exchange connector can include a first ion exchange membrane stack. The first ion exchange connector between the electrolyte reservoir and the eluent generation chamber. The ion source and ion recycle module can include a second electrolyte reservoir, an eluent recovery chamber, and a second ion exchange connector. The second electrolyte reservoir can include a second chamber and a third electrode. The second chamber can contain the aqueous electrolyte solution including an electrolyte. The second chamber can have a second chamber inlet and a second chamber outlet. The second chamber inlet can be fluidically connected to the first outlet of the first chamber. The second chamber inlet can be configured to receive depleted electrolyte solution from the first chamber. The second chamber outlet can be fluidically connected to first inlet of the first chamber. The second chamber outlet can be configured to provide recycled electrolyte solution to first chamber. The eluent recovery chamber can include a fourth electrode and the eluent recovery chamber can be configured to receive an eluent solution including eluent counter ions from the eluent generator. The second ion exchange connector can include a second ion exchange membrane stack. The second ion exchange connector can couple the second electrolyte reservoir and the eluent recovery chamber. The pump can be configured to circulate the aqueous electrolyte solution between the first chamber of the first electrolyte reservoir of the electrolytic eluent generator and the second chamber of the second electrolyte reservoir of the ion source and ion recycle module.

In various embodiments of the third aspect, the second electrode can be a perforated cathode and the fourth electrode can be a perforated anode.

In various embodiments of the third aspect, the second electrode can be a perforated anode and the fourth electrode can be a perforated cathode.

In various embodiments of the third aspect, the electrolytic eluent generator system can further include a power supply configured to drive a current between the third and fourth electrodes such that eluent counter ions move from the eluent recovery chamber to the electrolyte reservoir.

In various embodiments of the third aspect, the eluent counter ions can include potassium ions.

In various embodiments of the third aspect, the eluent counter ions can include methanesulfonate ions.

DRAWINGS

For a more complete understanding of the principles disclosed herein, and the advantages thereof, reference is now made to the following descriptions taken in conjunction with the accompanying drawings, in which.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DESCRIPTION OF VARIOUS EMBODIMENTS

Embodiments of systems and methods for ion separation are described herein.

The section headings used herein are for organizational purposes only and are not to be construed as limiting the described subject matter in any way.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless described otherwise, all technical and scientific terms used herein have a meaning as is commonly understood by one of ordinary skill in the art to which the various embodiments described herein belongs.

It will be appreciated that there is an implied "about" prior to the temperatures, concentrations, times, pressures, flow rates, cross-sectional areas, etc. discussed in the present teachings, such that slight and insubstantial deviations are within the scope of the present teachings. In this application, the use of the singular includes the plural unless specifically stated otherwise. Also, the use of "comprise", "comprises", "comprising", "contain", "contains", "containing", "include", "includes", and "including" are not intended to be limiting. It is to be understood that both the foregoing general description and the following detailed description are exemplary and explanatory only and are not restrictive of the present teachings.

As used herein, "a" or "an" also may refer to "at least one" or "one or more." Also, the use of "or" is inclusive, such that the phrase "A or B" is true when "A" is true, "B" is true, or both "A" and "B" are true. Further, unless otherwise required by context, singular terms shall include pluralities and plural terms shall include the singular.

A "system" sets forth a set of components, real or abstract, comprising a whole where each component interacts with or is related to at least one other component within the whole.

Chromatography System

Figure 1:
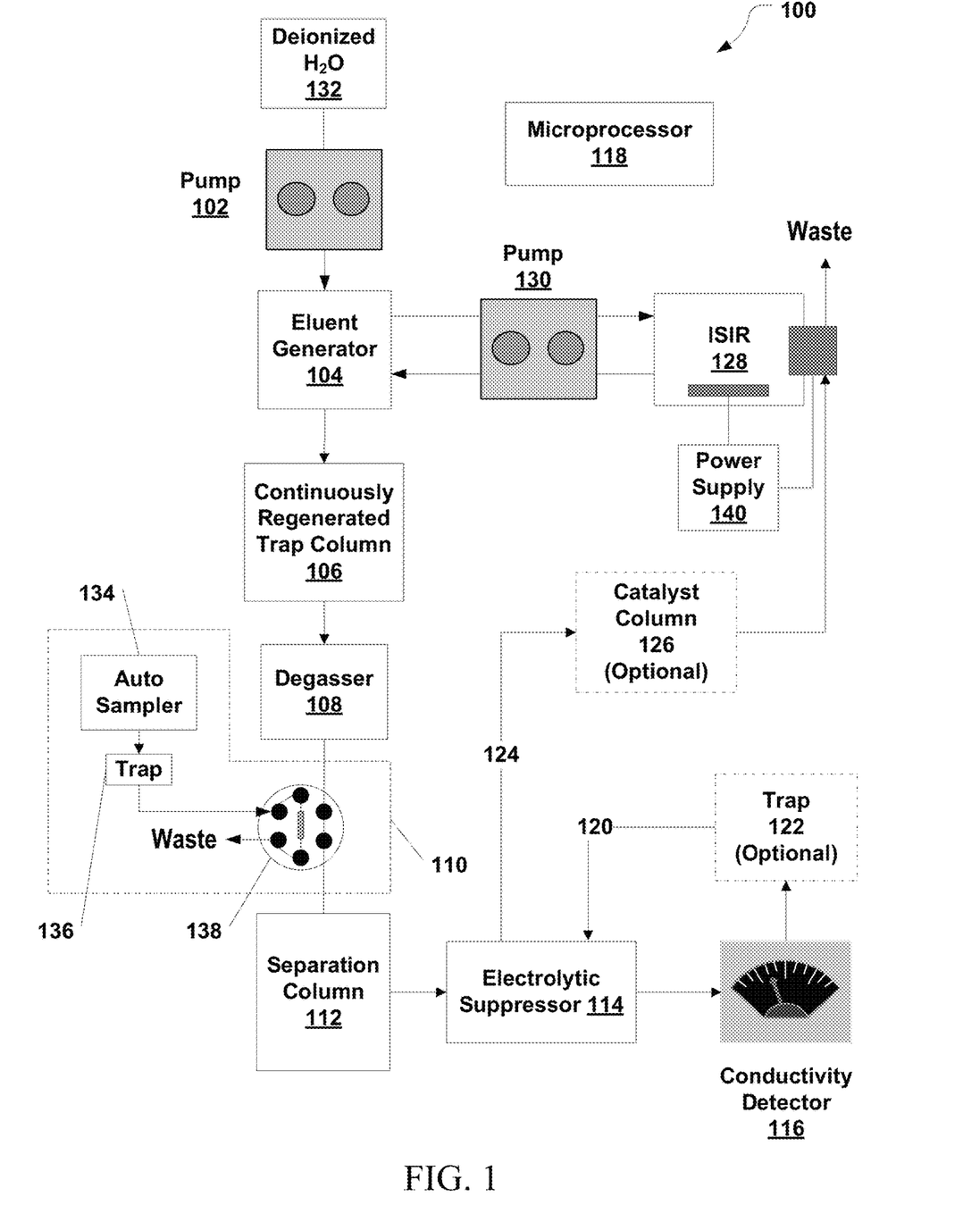
FIG. 1 illustrates an exemplary chromatography system that includes an ISIR module, in accordance with various embodiments.

FIG. 1 illustrates an embodiment of a chromatography system 100. Chromatography system 100 may include a pump 102, an electrolytic eluent generator 104, a continuously regenerated trap column 106, a degasser 108, a sample injector 110, a chromatographic separation device 112, an electrolytic suppressor 114, a detector 116, and a microprocessor 118. This portion of the plumbing is similar to a standard setup of the ion chromatograph. Chromatographic separation device 112 may be in the form of a capillary column or an analytical column. A recycle line 120 may be used to transfer the liquid from an output of detector 116 to an inlet of the electrolytic suppressor 114. An optional trap 122 can be used to capture analyte ions. Recycle line 124 may be used to transfer liquid from an outlet of the regenerant channel of the electrolytic suppressor 114 to an inlet of an optional catalyst column 126 and recycle line 128 may be used to transfer liquid from an outlet of the optional catalyst column 126 to an ISIR module 128. Additionally, pump 130 can circulate recovered eluent source ions from the ISIR module 128 to the eluent generator 104.

Pump 102 can be configured to pump a liquid from a liquid source 132 and be fluidically connected to electrolytic eluent generator 104. In an embodiment, the liquid may be deionized water, an aqueous solution with electrolyte(s), or a mixture of an organic solvent with deionized water or with aqueous electrolyte(s) solution. A few example electrolytes are sodium acetate and acetic acid. The eluent mixture that contains an organic solvent may include a water miscible organic solvent such as, for example, methanol. Pump 102 can be configured to transport the liquid at a pressure ranging from about 20 PSI to about 15,000 PSI. Under certain circumstances, pressures greater than 15,000 PSI may also be implemented. It should be noted that the pressures denoted herein are listed relative to an ambient pressure (13.7 PSI to 15.2 PSI). Pump 102 may be in the form of a high-pressure liquid chromatography (HPLC) pump. In addition, pump 102 can also be configured so that the liquid only touches an inert portion of pump 102 so that a significant amount of impurities does not leach out. In this context, significant means an amount of impurities that would interfere with the intended measurement. For example, the inert portion can be made of polyether ether ketone (PEEK) or at least coated with a PEEK lining, which does not leach out a significant amount of ions when exposed to a liquid.

An eluent is a liquid that contains an acid, base, salt, or mixture thereof and can be used to elute an analyte through a chromatography column. In addition, an eluent can include a mixture of a liquid and a water miscible organic solvent, where the liquid may include an acid, base, salt, or combination thereof. Electrolytic eluent generator 104 is configured to generate a generant. A generant refers to a particular species of acid, base, or salt that can be added to the eluent. In an embodiment, the generant may be a base such as cation hydroxide or the generant may be an acid such as carbonic acid, phosphoric acid, acetic acid, methanesulfonic acid, or a combination thereof.

Referring to FIG. 1, eluent generator 104 can be configured to receive the liquid from pump 102 and then add a generant to the liquid. The liquid containing the generant can be outputted from eluent generator 104 to an inlet of continuously regenerated trap column 106.

Continuously regenerated trap column 106 is configured to remove cationic or anionic contaminants from the eluent. Continuously regenerated trap column 106 can include an ion exchange bed with an electrode at the eluent outlet. An ion exchange membrane stack can separate the eluent from a second electrode and contaminate ions can be swept through the ion exchange membrane stack towards the second electrode. The ion exchange membrane stack can include one or more ion exchange membranes. In various embodiments, anion removal can utilize an anion exchange bed with a cathode at the eluent outlet separated from an anode by an anion exchange membrane. Alternatively, cation removal can utilize a cation exchange bed with an anode at the eluent outlet separated from a cathode by a cation exchange membrane.

Degasser 108 may be used to remove residual gas. In an embodiment, a residual gas may be hydrogen and oxygen. Degasser 108 may include a tubing section that is gas permeable and liquid impermeable such as, for example, amorphous fluoropolymers or more specifically Teflon AF. The flowing liquid can be outputted from degasser 108 to sample injector 110 with a substantial portion of the gas removed.

Sample Injector 110 can be used to inject a bolus of a liquid sample into an eluent stream. The liquid sample may include a plurality of chemical constituents (i.e., matrix components) and one or more analytes of interest. The sample injector 110 can include an auto sampler 134, a trap column 136 for exchanging sample counterions with regenerant ions such as hydronium or hydroxide for cation and anion applications respectively, and a multiport valve 138. The auto sampler 134 can draw a sample from a sample container. The sample can be injected through the trap column 136. The multiport valve 138 can be in a first position to allow the sample to fill a sample loop. After the sample loop is filled, the multiport valve can switch to a second position and the eluent stream can drive the sample onto the chromatographic separation device 112.

Chromatographic separation device 112 can be used to separate various matrix components present in the liquid sample from the analyte(s) of interest. Typically, chromatographic separation device 112 may be in the form of a hollow cylinder that contains a packed stationary phase. As the liquid sample flows through chromatographic separation device 112, the matrix components and target analytes can have a range of retention times for eluting off of chromatographic separation device 112. Depending on the characteristics of the target analytes and matrix components, they can have different affinities to the stationary phase in chromatographic separation device 112. An output of chromatographic separation device 112 can be fluidically connected to electrolytic suppressor 114.

Electrolytic suppressor 114 can be used to reduce eluent conductivity background and enhance analyte response through efficient exchange of eluent counterions for regenerant ions. Electrolytic suppressor 114 can include an anode chamber, a cathode chamber, and an eluent suppression bed chamber separated by ion exchange membranes. The anode chamber and/or cathode chamber can produce regenerate ions or transport supplied regenerant ions. The eluent suppression bed chamber can include a flow path for the eluent separated from the regenerant by an ion exchange barrier and eluent counterions can be exchanged with regenerate ions across the ion exchange barrier. An output of electrolytic suppressor 114 can be fluidically connected to detector 116 to measure the presence of the separated chemical constituents of the liquid sample.

Detector 116 may be in the form of ultraviolet-visible spectrometer, a fluorescence spectrometer, an electrochemical detector, a conductometric detector, or a combination thereof. The detector 116 is preferably a non-destructive detector that preserves substantially the eluent stream from the suppressor eluent output.

The fluidic output of the eluent from detector 116 can be recycled to the regenerant channel of electrolytic suppressor 114 via recycle line 120 after optionally passing through a trap column 122 for trapping the analyte ions. The trap column can be configured to remove analyte ions while passing the liquid and any remaining eluent ions through to the electrolytic suppressor 114. The fluidic output of the electrolytic suppressor 114 which contains the eluent ions can be sent to an optional catalyst column 126. The catalyst column 126 can recombine hydrogen and oxygen gas to form water in an eluent stream. Additionally, the catalyst column can reduce any residual electrolysis byproducts such as hydrogen peroxide. The fluidic output of the catalyst column 126 can be sent to the ISIR module 128.

ISIR module 128 can be configured to receive the liquid from optional catalyst column 126 or electrolytic suppressor 114 and then remove the generant ions from the liquid. The liquid, after a significant reduction in generate concentration can be outputted from ISIR module 128 to waste. The generant can be combined with the source solution. To achieve this, the ISIR module 128 can include an ion exchange membrane stack separating a generant source solution from the liquid stream. The ion exchange membrane stack can include one or more ion exchange membranes. A current from power supply 140 can be applied to electrodes on either side of the ion exchange membrane to selectively drive generant ions from the liquid through the ion exchange membrane and into the generant source solution.

Pump 130 can circulate the generant source solution between the ISIR module 128 and the eluent generator 104 to continuously supply the eluent generator 104 with fresh generant source solution for the addition of generant ions into the eluent stream. Thus, a self-sustaining source of the generant source solution can be achieved as per the present invention. In various embodiments, the pump 130 can continuously circulate the generant source solution, intermittently circulate the generant source solution, or replace the generant source solution in the eluent generator 104 with fresh generant source solution from the ISIR module 128 in batches periodically.

An electronic circuit may include microprocessor 118, a timer, and a memory portion. In addition, the electronic circuit may include a power supply that are configured to apply a controlling signal, respectively. Microprocessor 118 can be used to control the operation of chromatography system 100. Microprocessor 118 may either be integrated into chromatography system 100 or be part of a personal computer that communicates with chromatography system 100. Microprocessor 118 may be configured to communicate with and control one or more components of chromatography system such as pump 102, pump 130, eluent generator 104, sample injector 110, detector 116, and ISIR module 128. The memory portion may be used to store instructions to set the magnitude and timing of the current waveform with respect to the switching of sample injector 110 that injects the sample.

One advantage of the present invention is the ISIR module 128 in conjunction with the eluent generator 104 can be miniaturized in terms of dimensions. Prior commercial versions of the eluent generator cartridge have been designed to maximize the usage by having a relatively large volume of the eluent concentrate at a high concentration. Typically, the volume ranges from 500 to 800 mL and the concentration ranges from 2 to 4 M of the source reagent. In contrast, in the present disclosure, since the generant is constantly recycled into the ISIR and this action ensures that the source supply to the eluent generator is maintained and the eluent generator can operate without any downtime. The preferable concentration of the eluent generator in the present application can be in the 200 mM concentration and at a volume of about 50 ml. Similarly, the ISIR module can have a volume of 50 ml. The concentration in the ISIR can be also start at 200 mM. Thus, a large reduction in footprint of the eluent generator and the ISIR module is feasible.

In various embodiments, the ion removal, such as in continuously regenerated trap column 106 and optional trap 122, can be accomplished by using packed bed columns. Other multichannel membrane-based devices can also be applied for this function. When using membrane-based devices, a recycled deionized water stream will be used for this operation. The packed bed devices may need to be replaced periodically. Membrane-based devices can be continuously operated but can require a separate water stream for operation. If complete recycle of the eluent is not desired, then the effluent from the ISIR recycle channel can be routed to the regenerant channels of the membrane-based devices. When complete recycle is desired then the outlet from the recycle channel can be routed to the deionized water reservoir for recycling the deionized water since after the recycle aspect the stream should be free of any ions.

Figure 2:
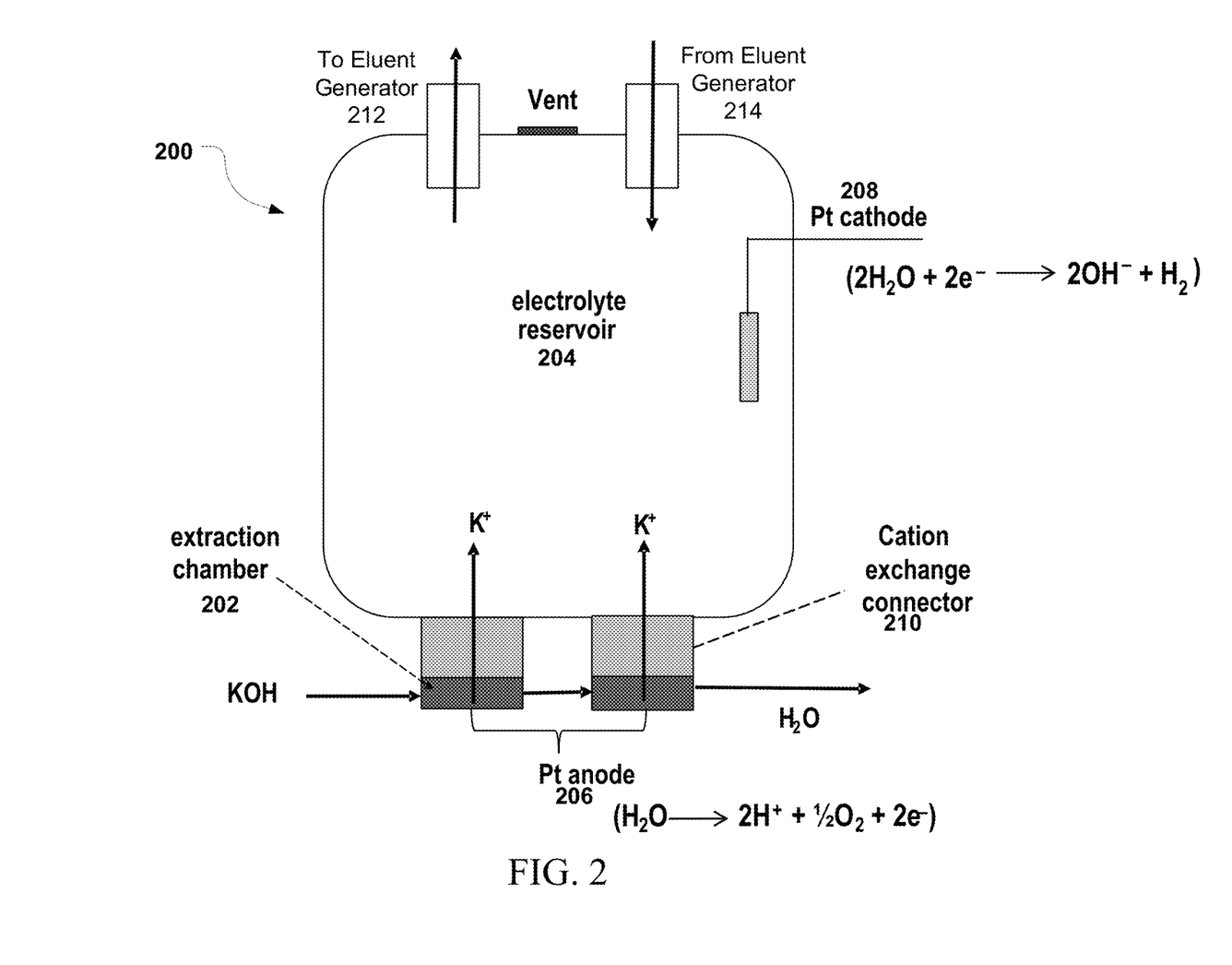
FIG. 2 illustrates an exemplary ISIR module, in accordance with various embodiments.

FIG. 2 illustrates the operation principle of an ISIR module 200. The ISIR module 200 can include an eluent recovery chamber 202 and an electrolyte reservoir 204.

The eluent recovery chamber 202 can contain a perforated platinum (Pt) electrode 206. The electrolyte reservoir 204 can contain a Pt electrode 208 and a recovered electrolyte solution. In various embodiments, the ISIR module 200 can recover a cation electrolyte, such as potassium ions, electrode 206 can be an anode where hydronium ions can be formed from electrolysis, and electrode 208 can be a cathode where hydroxide ions can be formed. In other embodiments, the ISIR module 200 can recover ions, such as phosphate ions, acetate ions, and methanesulfonate ions, electrode 206 can be a cathode where hydroxide ions can be formed, and electrode 208 can be an anode where hydronium ions can be formed. The eluent recovery chamber 202 can be connected to the electrolyte reservoir 204 by means of an exchange connector 210 which can permit the passage of ions of only one charge, either anions or cations, from the eluent recovery chamber 202 into the electrolyte reservoir 204.

In various embodiments, where the ISIR module 200 is recovering cations, the exchange connector 210 can permit the passage of cations while substantially preventing the passage of anions from the eluent recovery chamber 202 to the electrolyte reservoir 204. In alternate embodiments where the electrolytic ISIR module 200 is recovering anions, the exchange connector 210 can permit the passage of anions while substantially preventing the passage of cations from the eluent recovery chamber 202 to the electrolyte reservoir 204.

The electrolyte reservoir 204 can include outlet 212 to transport recovered electrolyte solution to the eluent generator and inlet 214 to receive depleted electrolyte solution from the eluent generator. In various embodiments, the electrolytic reservoir 204 can be partially filled with fluid such that the is a fluid-filled portion and a gas-filled portion contained in the electrolyte reservoir 204. The outlet 212 can withdrawal solution from the fluid filled portion. The inlet 214 can supply the fluid within either the gas-filled portion or the fluid-filled portion. Placement of the inlet 212 and outlet 214 can be such that fluid entering through the inlet 212 thoroughly mixed with the solution with the electrolyte reservoir 204 before reaching the outlet 214.

In various embodiments, the eluent recovery chamber can be packed with ion exchange screens or resins or monolithic material or combinations thereof to maximize transfer of the regenerant ions.

To recover a KOH eluent, the eluent can move through the eluent recovery chamber 202 and a current can be applied between the electrode 208 and electrode 206. Under the applied electric field, the electrolysis of water can occur at both the electrode 208 and electrode 206 of the device 200. Water can be oxidized to form H+ ions and oxygen gas at the electrode 206 in the eluent recovery chamber 202: $H_2O \rightarrow 2H+ + 1/2\ O_2 \uparrow + 2e-$. Water can be reduced to form OH— ions and hydrogen gas at the electrode 208 in the electrolyte reservoir 204: $2H_2O + 2e - \rightarrow 2\ OH— + H_2 \uparrow$. As H+ ions, generated at the anode 206 it consumes the hydroxide ions in the eluent to form water while $K^+$ ions in the eluent migrates across the cation exchange connector 210 into the electrolyte reservoir 204. These $K^+$ ions can combine with hydroxide ions generated at the cathode 208 to produce the KOH solution, which can be used by the eluent generator as a source of K+ ions. The reduction in concentration of K+ in the eluent can be proportional to the current applied to the ISIR module 200 and the flow rate through the eluent recovery chamber 202.

To recover a methanesulfonic acid eluent, the eluent can move through the eluent recovery chamber 202 and a current can be applied between the electrode 208 and electrode 206. Under the applied electric field, the electrolysis of water can occur at both the electrode 208 and electrode 206 of the device 200. Water can be oxidized to form H+ ions and oxygen gas at electrode 208 in the electrolyte reservoir 204: $H_2O \rightarrow 2H+ + 1/2\ O_2 \uparrow + 2e-$. Water can be reduced to form OH— ions and hydrogen gas at electrode 206 in the eluent recovery chamber 202: $2H_2O + 2e- \rightarrow 2\ OH— + H_2 \uparrow$. As $OH^-$ ions, generated at the electrode 206 it consumes the hydronium ions in the eluent to form water while methanesulfonate ions in the eluent recovery chamber 202 migrates across the anion exchange connector 210 into the electrolyte reservoir 204. These methanesulfonate ions can combine with hydronium ions generated at the electrode 208 to produce the methanesulfonic acid solution, which can be used by the eluent generator as a source of methanesulfonate ions. The concentration of generated methanesulfonic acid can be proportional to the current applied to the ISIR module 200 and the flow rate through the eluent recovery chamber 202.

Figure 3:
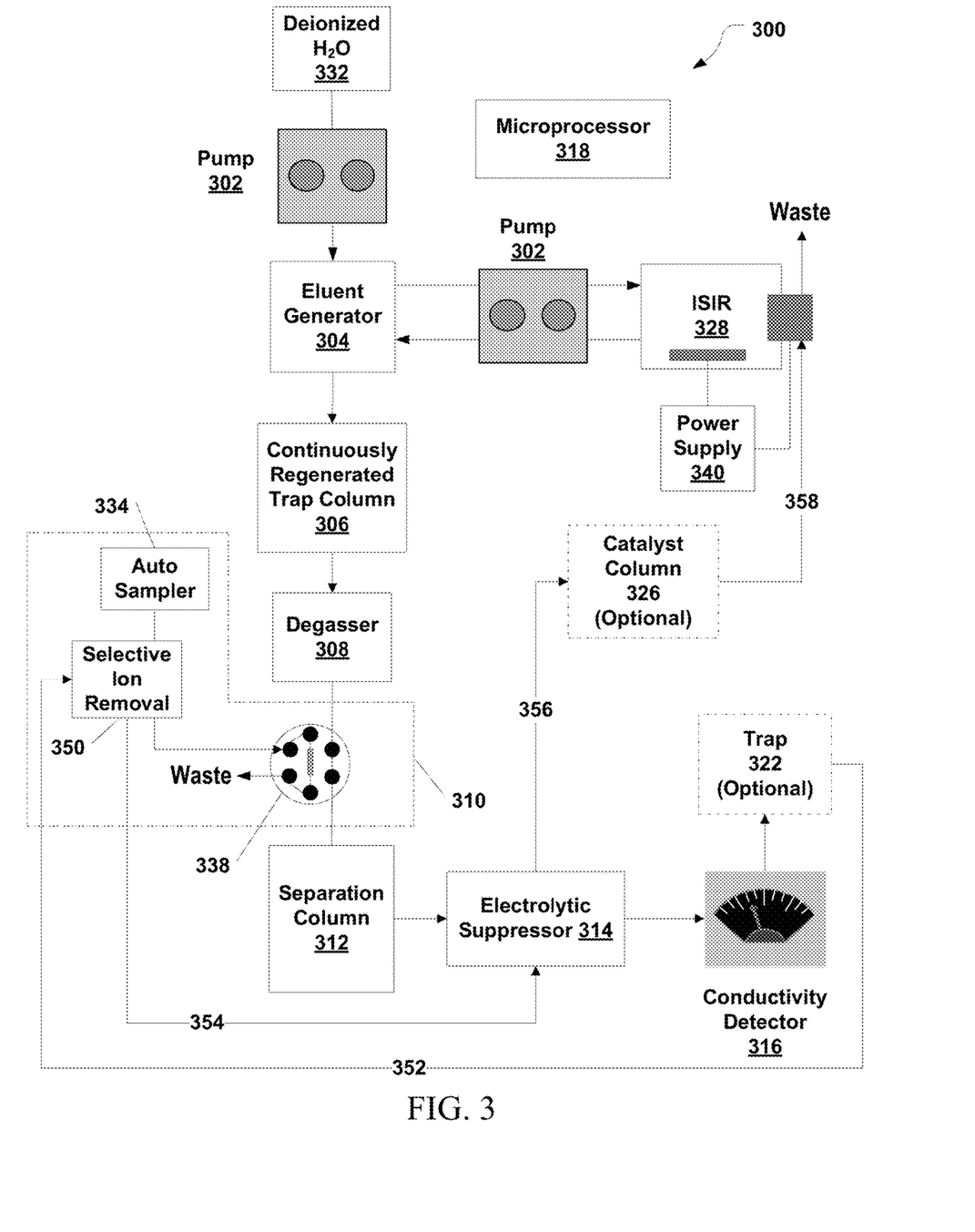
FIG. 3 illustrates an exemplary chromatography system that includes an ISIR module and utilizing selective ion removal for the sample, in accordance with various embodiments.

FIG. 3 illustrates an embodiment of a chromatography system 300 where ions are selectively removed from the sample prior to combining with the eluent. Chromatography system 300 may include a pump 302, an electrolytic eluent generator 304, a continuously regenerated trap column 306, a degasser 308, a sample injector 310, a chromatographic separation device 312, an electrolytic suppressor 314, a detector 316, and a microprocessor 318. Chromatographic separation device 312 may be in the form of a capillary column or an analytical column. A recycle line 320 may be used to transfer the liquid from an output of detector 316 to an inlet of the selective ion removal 350. An optional trap 322 can be used to capture analyte ions. Recycle line 324 may be used to transfer liquid from an outlet of selective ion removal 350 to an inlet of the electrolytic suppressor 314, recycle line 356 may be used to transfer liquid from an outlet of electrolytic suppressor 314 to an inlet of an optional catalyst column 326, and recycle line 358 may be used to transfer liquid from an outlet of the optional catalyst column 326 to an ISIR module 328. Additionally, pump 330 can circulate recovered eluent ions from the ISIR module 328 to the eluent generator 304.

Sample Injector 310 can be used to inject a bolus of a liquid sample into an eluent stream. The liquid sample may include a plurality of chemical constituents (i.e., matrix components) and one or more analytes of interest. The sample injector 310 can include an auto sampler 334, selective ion removal 350, and a multiport valve 338. The auto sampler 334 can draw a sample from a sample container. The sample can be provided to the selective ion removal which can selectively remove counter ions but leave analyte ions in the sample. The multiport valve 338 can be in a first position to allow the sample to fill a sample loop. After the sample loop is filled, the multiport valve can switch to a second position and the eluent stream can drive the sample onto the chromatographic separation device 312.

The fluidic output of the eluent from detector 316 can be recycled to the selective ion removal 350 via recycle line 352 after optionally passing through a trap column 322. The trap column can be configured to remove analyte ions while passing the treated liquid. The fluidic output of the selective ion removal 350 can be recycled to the electrolytic suppressor 314 via recycle line 254. The fluidic output of the electrolytic suppressor 314 can be sent to an optional catalyst column 326 via recycle line 356. The catalyst column 326 can recombine hydrogen and oxygen ions to form water. The fluidic output of the catalyst column 326 can be sent to the ISIR module 328 via recycle line 358.

Figure 4:
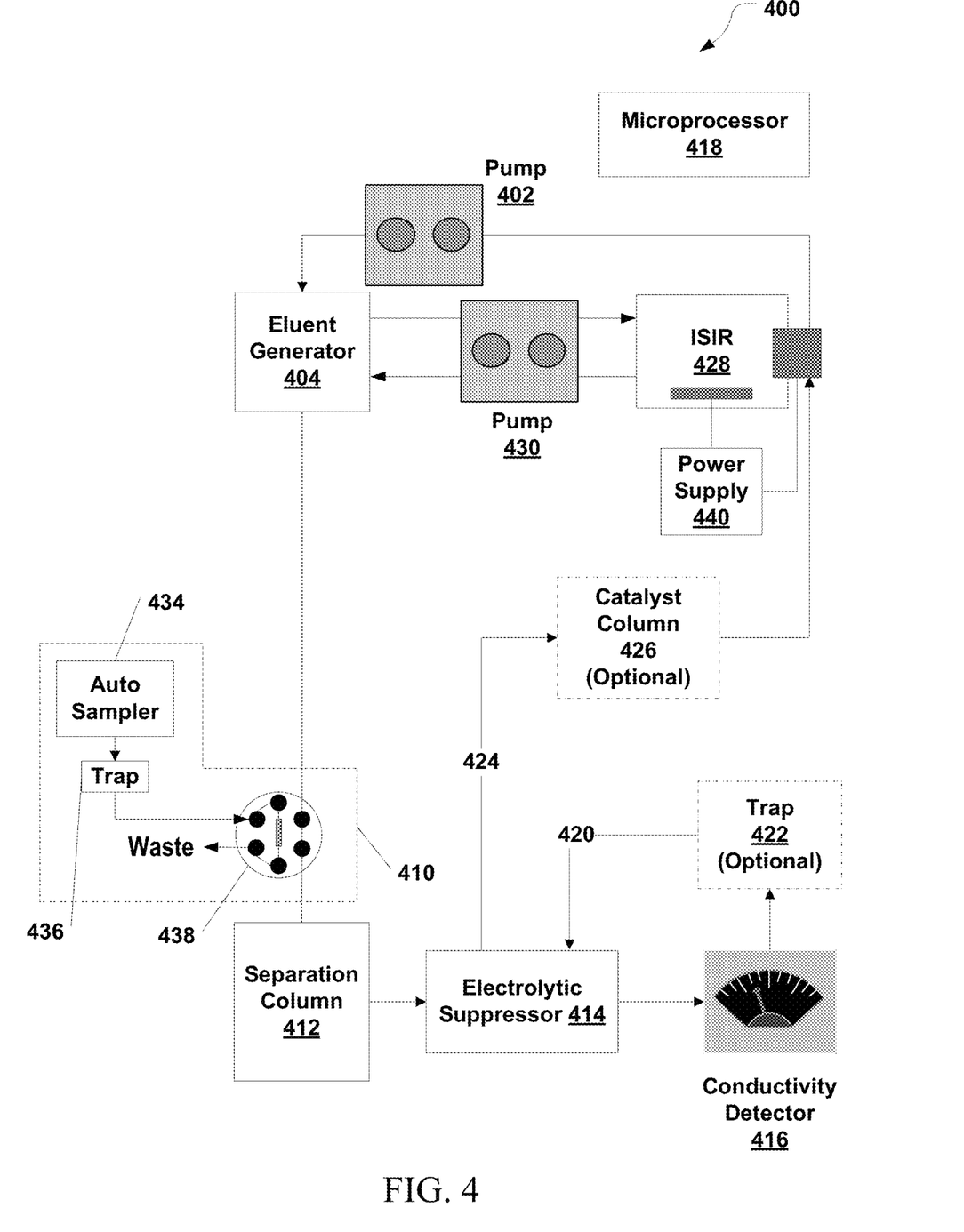
FIG. 4 illustrates an exemplary chromatography system that includes an ISIR module with liquid recycling and a 3-channel eluent generator, in accordance with various embodiments.

FIG. 4 illustrates an embodiment of a chromatography system 400 where the fluidic output of the ISM module is used as a source of liquid to a 3-channel electrolytic eluent generator. Chromatography system 400 may include a pump 402, an electrolytic eluent generator 404, a sample injector 410, a chromatographic separation device 412, an electrolytic suppressor 414, a detector 416, and a microprocessor 418. Chromatographic separation device 412 may be in the form of a capillary column or an analytical column. A recycle line 420 may be used to transfer the liquid from an output of detector 416 to an inlet of the electrolytic suppressor 414. An optional trap 422 can be used to capture analyte ions. Recycle line 424 may be used to transfer liquid from an outlet of electrolytic suppressor 414 to an inlet of an optional catalyst column 426 and recycle line 428 may be used to transfer liquid from an outlet of the optional catalyst column 426 to an ISIR module 428. Additionally, pump 430 can circulate recovered eluent ions from the ISIR module 428 to the eluent generator 404.

Pump 402 can be configured to pump a liquid from an outlet of the ISIR module 428 and be fluidically connected to electrolytic eluent generator 404. The electrolytic eluent generator 404 can be a 3-channel electrolytic eluent generator. In various embodiments, the 3-channel electrolytic eluent generator can include an inner channel separated from a first outer channel by a cation exchange membrane and a second outer channel by an anion exchange member. A current can be applied to drive reagent ions from the first outer channel into the inner channel and counter ions from the second outer channel into the inner channel, thus generating the eluent in the inner channel. Advantageously, since the electrodes are placed in the outer channels, any gas formation at the electrodes ($H_2$ or $O_2$) does not reach the inner channel, eliminating the need for a degasser. Such devices are illustrated in U.S. Pat. No. 5,045,204, hereby incorporated by reference in entirety for any purpose, with one exemplary example from FIG. 5 of U.S. Pat. No.

5,045,204 as described above. Such devices can find utility in the present invention. Additionally, a continuously regenerated trap column can also be eliminated.

The fluidic output of the eluent from detector 416 can be recycled to electrolytic suppressor 414 via recycle line 420 after optionally passing through a trap column 422. The trap column can be configured to remove analyte ions while passing the liquid and any remaining eluent ions through to the electrolytic suppressor 414. The fluidic output of the electrolytic suppressor 414 can be sent to an optional catalyst column 426. The catalyst column 426 can recombine hydrogen and oxygen ions to form water. The fluidic output of the catalyst column 426 can be sent to the ISIR module 428.

ISIR module 428 can be configured to receive the liquid from optional catalyst column 426 or electrolytic suppressor 414 and then remove the generant from the liquid. The liquid, after a significant reduction in generate concentration can be output from ISIR module 428 and used as a liquid source for eluent generator 404 as it is primarily water with the ions substantially removed. An optional reservoir can also be placed (not shown) to collect the liquid source. The generant can be added to a source solution. To achieve this, the ISIR module 428 can include an ion exchange membrane separating a generant source solution from the liquid stream. A current from power supply 440 can be applied to electrodes on either side of the ion exchange membrane to drive generant ions from the liquid through the membrane and into the generant source solution.

Figure 5:
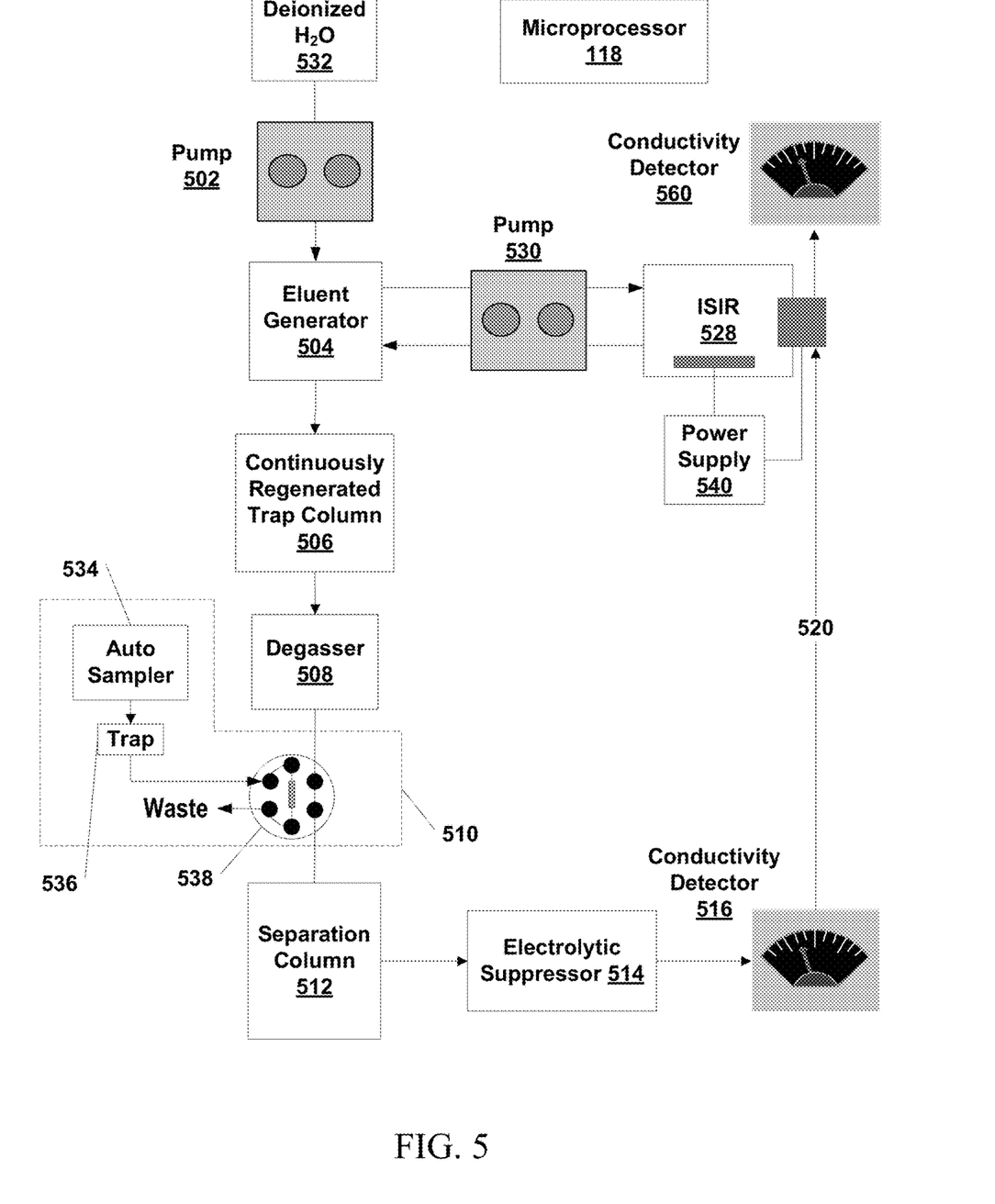
FIG. 5 illustrates an exemplary chromatography system that includes a 2-channel or 3-channel ISIR module, in accordance with various embodiments.

FIG. 5 illustrates an embodiment of a chromatography system 500 using a 2 or 3 channel ISIR module. Chromatography system 500 may include a pump 502, an electrolytic eluent generator 504, a continuously regenerated trap column 506, a degasser 508, a sample injector 510, a chromatographic separation device 512, an electrolytic suppressor 514, a detector 516, and a microprocessor 518. Chromatographic separation device 512 may be in the form of a capillary column or an analytical column. A recycle line 520 may be used to transfer the liquid from an output of detector 516 to an ISIR module 528. Additionally, pump 530 can circulate recovered eluent ions from the ISIR module 528 to the eluent generator 504.

The fluidic output of the eluent from detector 516 can be directed to ISIR module 528 via line 520 after optionally passing through a trap column 522.

ISIR module 528 can be a 2-channel module as depicted in FIG. 2 or 3-channel module. In various embodiments, a 3-channel ISIR module can include an inner channel separated from a first outer channel by a cation exchange membrane and a second outer channel by an anion exchange member to recovery potassium ions from a potassium hydroxide stream. A current can be applied to drive reagent ions from the first outer channel (containing the eluent from the detector 516) into the inner channel and counter ions from the inner channel into the second outer channel, thus recycling the reagent ions into the inner channel which can be pumped to the eluent generator 504. The output in this example from the first outer channel is pure water in this embodiment and can be used as the source of the deionized water for the eluent generator.

ISIR module 528 can be configured to receive the liquid from electrolytic suppressor 514 or optional catalyst column 526 and then remove the generant from the liquid. The liquid, after a significant reduction in generate concentration can be outputted from ISIR module 528 to conductivity detector 560. The generant can be added to a source solution. To achieve this, the ISIR module 528 can include an ion exchange membrane separating a generant source solution from the liquid stream. A current from power supply 540 can be applied to electrodes on either side of the ion exchange membrane to drive generant ions from the liquid through the membrane and into the generant source solution.

Figure 6:
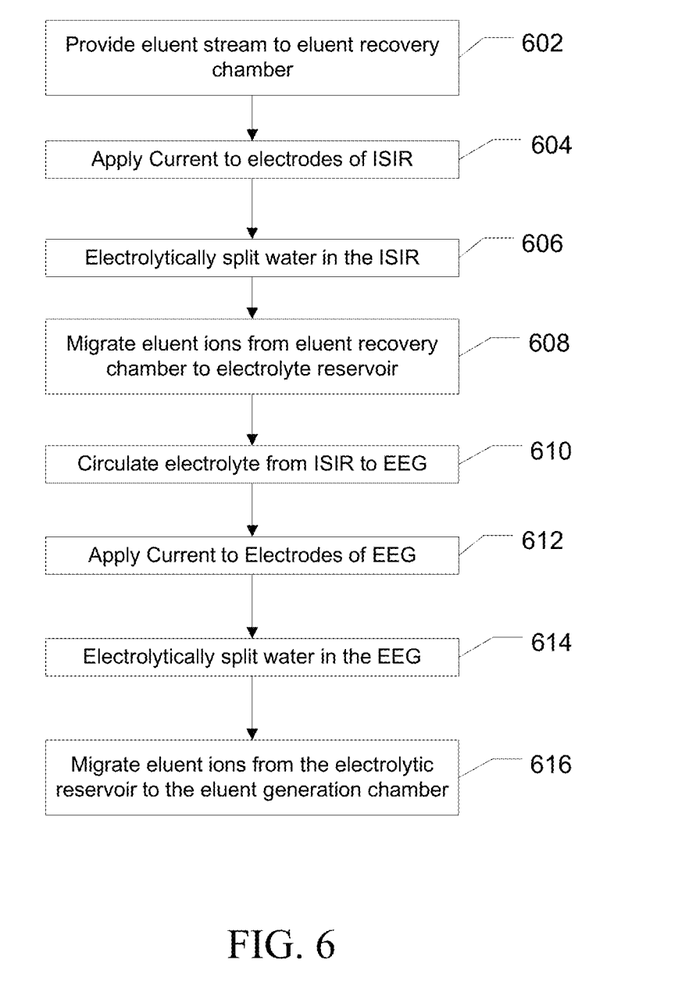
FIG. 6 illustrates an exemplary method of recycling eluent ions, in accordance with various embodiments.

FIG. 6 illustrates a method of recycling eluent counter ions from an eluent stream. At 602, the eluent stream can be provided to the eluent recovery chamber. At 604, a current can be supplied to the electrodes of the ISIR. At 606, the current can cause water to be electrolytically split at the electrodes of the ISIR, and, at 608, eluent counter ions can migrate from the eluent stream in the eluent recovery chamber to the electrolyte reservoir. At 610, the electrolyte solution containing the recovered eluent counter ions can be circulated from the ISIR to an electrolytic eluent generator. Depleted electrolyte solution can be circulated back to the ISM to be refreshed with recovered eluent counter ions.

At 612, a current can be applied to the electrodes of the electrolytic eluent generator. At 614, the current can cause water to be electrolytically split at the electrodes of the electrolytic eluent generator, and, at 616, eluent counter ions can migrate from electrolyte solution in the electrolyte reservoir to the eluent stream in the eluent generation chamber. The freshly produced eluent stream can be used to chromatically separate a sample prior to returning to the ISIR for recovery of eluent counter ions.

What is claimed is:

1. An ion source and ion recycle module comprising:
   an electrolyte reservoir including:
      a chamber containing an aqueous electrolyte solution including an electrolyte, the chamber having a chamber inlet and a chamber outlet, the chamber inlet fluidically connected to a source chamber of an electrolytic eluent generator and configured to receive depleted electrolyte solution from the source chamber of the electrolytic eluent generator, the chamber outlet fluidically connected to the source chamber of the electrolytic eluent generator and configured to provide recycled electrolyte solution to the electrolytic eluent generator source chamber; and
      a first electrode;
   an eluent recovery chamber including a second electrode and configured to receive an eluent solution including eluent counter ions from the eluent generator; and
   an ion exchange connector including an ion exchange membrane stack, the ion exchange connector coupling the electrolyte reservoir and the eluent recovery chamber.

2. The ion source and ion recycle module of claim 1 wherein the second electrode is a perforated electrode.

3. The ion source and ion recycle module of claim 1 further comprising a pump configured to circulate the aqueous electrolyte solution to the source chamber of an electrolytic eluent generator.

4. The ion source and ion recycle module of claim 1 further comprising a power supply configured to drive a current between the first and second electrodes such that eluent counter ions move from the eluent solution in the eluent recovery chamber to the aqueous electrolyte solution in the electrolyte reservoir.

5. The ion source and ion recycle module of claim 1 wherein the eluent counter ions include potassium ions.

6. An electrolytic eluent generator system comprising:
an electrolytic eluent generator including:
- an electrolyte reservoir including:
  - a first chamber containing an aqueous electrolyte solution, the first chamber including a first inlet and a first outlet; and
  - a first electrode;
- an eluent generation chamber including a second electrode; and
- a first ion exchange connector including a first ion exchange membrane stack, the first ion exchange connector between the electrolyte reservoir and the eluent generation chamber;

an ion source and ion recycle module including:
- a second electrolyte reservoir including:
  - a second chamber containing the aqueous electrolyte solution including an electrolyte, the second chamber having a second chamber inlet and a second chamber outlet, the second chamber inlet fluidically connected to the first outlet of the first chamber, the second chamber inlet configured to receive depleted electrolyte solution from the first chamber, the second chamber outlet fluidically connected to first inlet of the first chamber, and the second chamber outlet configured to provide recycled electrolyte solution to first chamber; and
  - a third electrode;
- an eluent recovery chamber including a fourth electrode and configured to receive an eluent solution including eluent counter ions from the eluent generator; and
- a second ion exchange connector including a second ion exchange membrane stack, the second ion exchange connector coupling the second electrolyte reservoir and the eluent recovery chamber; and a pump configured to circulate the aqueous electrolyte solution between the first chamber of the first electrolyte reservoir of the electrolytic eluent generator and the second chamber of the second electrolyte reservoir of the ion source and ion recycle module.

7. The electrolytic eluent generator system of claim 6 wherein the second electrode is a perforated cathode and the fourth electrode is a perforated anode.

8. The electrolytic eluent generator system of claim 6 wherein the second electrode is a perforated anode and the fourth electrode is a perforated cathode.

9. The electrolytic eluent generator system of claim 6 further comprising a power supply configured to drive a current between the third and fourth electrodes such that eluent counter ions move from the eluent recovery chamber to the electrolyte reservoir.

10. The electrolytic eluent generator system of claim 6 wherein eluent counter ions include potassium ions.

* * * * *